(12) United States Patent
Sieberer (10) Patent No.: US 7,654,767 B2
(45) Date of Patent: Feb. 2, 2010

(54) TRANSPORT SECURING ARRANGEMENT

(75) Inventor: Franz Sieberer, Weissenkirchen (AT)

(73) Assignee: Palfinger AG, Bergheim (AT)

( * ) Notice: Subject to any disclaimer, the term of this patent is extended or adjusted under 35 U.S.C. 154(b) by 936 days.

(21) Appl. No.: 10/773,275

(22) Filed: Feb. 9, 2004

(65) Prior Publication Data
US 2004/0175228 A1 Sep. 9, 2004

(30) Foreign Application Priority Data
Feb. 14, 2003 (EP) ................... 03003365

(51) Int. Cl.
*B60S 9/10* (2006.01)
*B66C 23/78* (2006.01)

(52) U.S. Cl. ............. 403/322.4; 403/318; 403/325

(58) Field of Classification Search ........... 403/318, 403/321, 321.1, 322.4, 325; 292/341.15, 292/336.3, 347, 348, DIG. 61, 31
See application file for complete search history.

(56) References Cited

U.S. PATENT DOCUMENTS

| | | | | |
|---|---|---|---|---|
| 3,789,638 A | * | 2/1974 | Roberts et al. | ............ 70/366 |
| 4,547,008 A | * | 10/1985 | Takasaki | ............ 292/341.15 |
| 4,943,181 A | * | 7/1990 | Murphy | ............ 403/322.4 |
| 5,046,340 A | * | 9/1991 | Weinerman et al. | .. 292/DIG. 31 |
| 5,470,167 A | | 11/1995 | Benckert et al. | |

* cited by examiner

*Primary Examiner*—Daniel P Stodola
*Assistant Examiner*—Ernesto Garcia
(74) *Attorney, Agent, or Firm*—Wenderoth, Lind & Ponack, L.L.P.

(57) ABSTRACT

A transport securing arrangement for a side extension arm of a vehicle includes a locking device and a securing hook, wherein the locking device is arranged in relation to the securing hook in such a way that release of the locking device leads to the release of the securing hook from its anchorage.

9 Claims, 12 Drawing Sheets

TRANSPORT SECURING ARRANGEMENT

FIELD OF THE INVENTION

The present invention relates to a transport securing arrangement for a side extension arm of a vehicle having a locking device and a securing hook.

BACKGROUND OF THE INVENTION

By increasing a support surface, side extension arms are able to increase the stability of the parked vehicle, whereby, for example, in the case of a vehicle fitted with a crane, the steadiness of the vehicle is increased. While the vehicle is moving, it is necessary to ensure that the side extension arms remain in their fully retracted transport position and do not by mistake move into a partially or completely extended position. In this regard, a regulating standard requires that transport securing arrangements for side extension arms of this kind include a locking device and an additional independent securing hook.

SUMMARY OF THE INVENTION

The object of the present invention is to ensure easy handling of transport securing arrangements, in spite of the duplication of the securing systems.

In accordance with the present invention, a locking device is arranged in relation to a securing hook in such a way that release of the locking device leads to release of the securing hook from its anchorage.

The arrangement according to the present invention provides that both securing systems can be released by one movement of the hand.

An advantageous embodiment of the present invention provides that the securing hook is mounted pivotably. Advantageously, there may be provided a spring which urges the securing hook into the anchorage position in order to prevent it from unintentionally pivoting open. In order to optimize reliability, the locking device can also be acted upon by a spring in the direction of the locking position.

The locking device is advantageously releasable by rotation. This can be accomplished by providing the locking device with at least one guide surface which extends in an inclined manner relative to a longitudinal center line of the locking device, wherein upon rotation of the locking device, the guide surface slides along a pin.

To facilitate handling of the locking device, it is releasable independently of the direction of rotation by rotary movement. This can be accomplished by the arrangement of two guide surfaces involving opposite screw directions.

A structurally particularly simple embodiment of the invention provides that the securing hook partially bears against a portion of the locking device, which is eccentrically shaped, for example, having a cam-shaped configuration.

BRIEF DESCRIPTION OF THE DRAWINGS

Further features and details of the invention will be apparent from the specific description hereinafter. In the drawings:

FIGS. 11a, 11b and 11c show the transport securing arrangement with the side extension arm partly pushed in.

DETAILED DESCRIPTION OF THE INVENTION

Figures 1A, 1B:
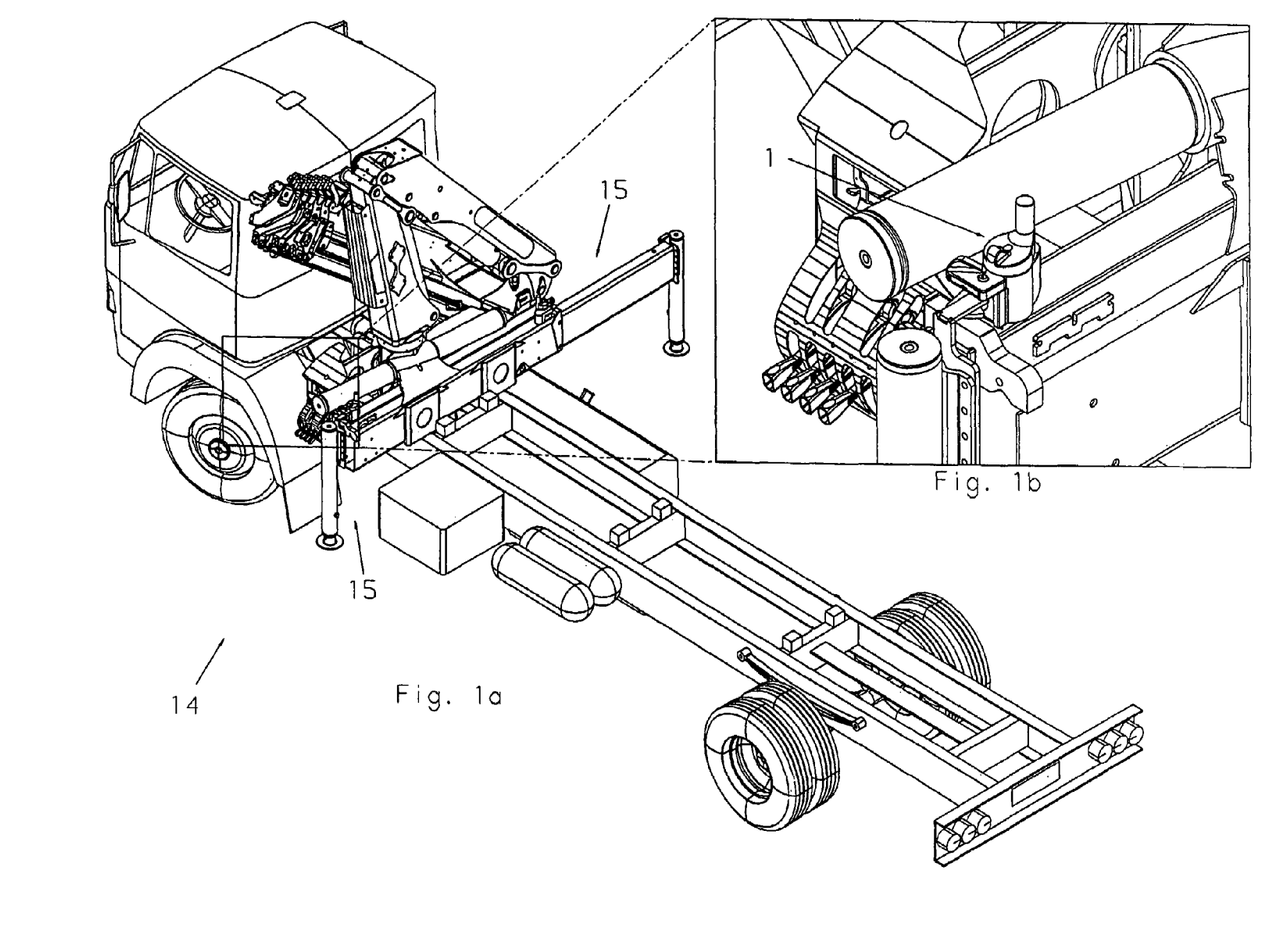
FIG. 1a shows a vehicle with side extension arms which are secured by a transport securing arrangement according to the invention.
FIG. 1b shows a detail view relating to the structure shown in FIG. 1a, showing the arrangement of the locking device according to the invention.

FIG. 1a shows a vehicle 14 with a vehicle superstructure in the form of a crane, wherein the vehicle 14 has two side extension arms 15. FIG. 1a shows the right side extension arm 15 after being moved completely into its working position. FIG. 1b shows a detail view of FIG. 1a illustrating the arrangement of a transport securing arrangement according to the present invention.

Figure 2A:
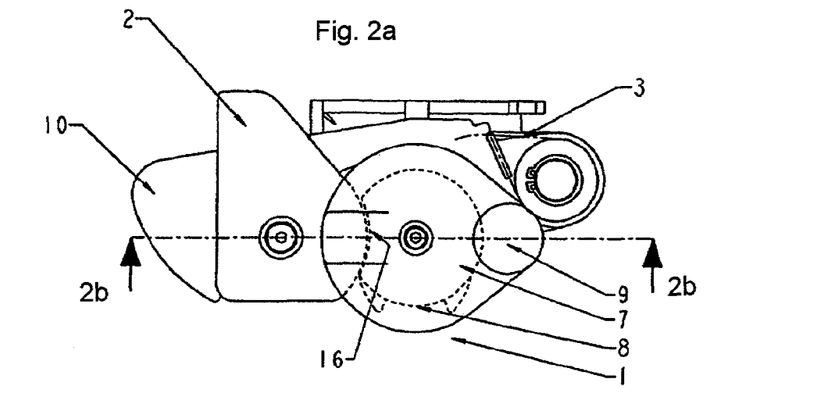
FIGS. 2a, 2b and 2c are a plan view, a longitudinal section and a cross-section, respectively, of the transport securing arrangement according to the invention with a side extension arm in the secured and locked transport position.

FIG. 2a shows a plan view of the transport securing arrangement, illustrating two constituent parts of the transport securing arrangement which are arranged so as to be stationary on the vehicle superstructure. The two constituent parts include a locking device 1 and a securing hook 10. As shown in FIG. 2a, the securing hook 10 is urged by a spring 3 in the direction of its anchorage position. The locking device 1 is rotatably supported and can be rotated by an operator by way of a handle 9. FIG. 1a also shows a cam-shaped portion 7 of the locking device 1, wherein the portion 7 is also rotated upon actuation of the handle 9. The cam-shaped portion 7 has a recess 16, wherein in the illustrated condition the locking device 1 is safeguarded against unintentional actuation by the clamping lever 2 which fixes the cam-shaped portion 7 at the recess 16 thereof in a positively locking relationship.

Figure 2B:
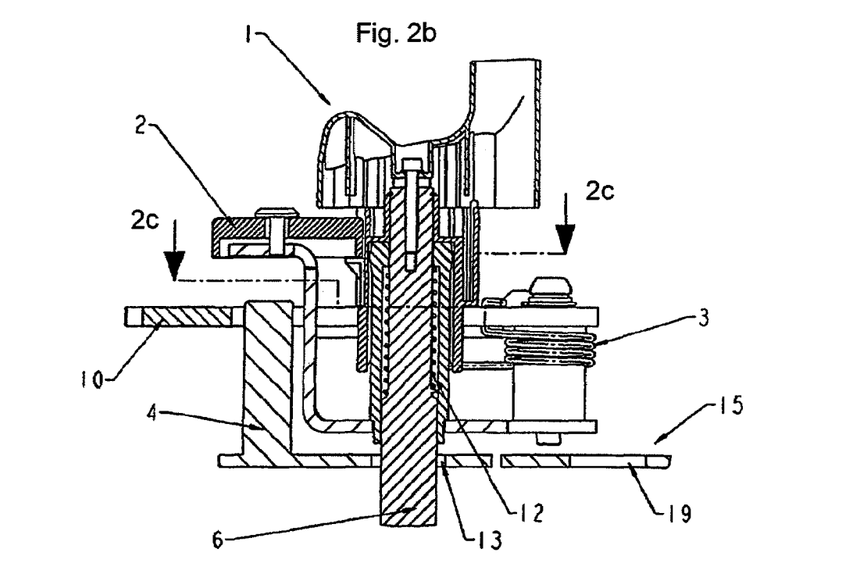

FIG. 2b shows a cross-section taken along line 1-1 in FIG. 2a, additionally showing a pin portion 4 which is arranged on the side extension arm 15 and which forms the anchorage position of the securing hook 10, and a pin 6 for anchoring the locking device 1. The pin 6 is urged by a spring 12 in the direction of the illustrated locking opening 13. Unintentional movement of the side extension arm 15 out of its secured and locked transport position as illustrated is prevented both by the securing hook 10 which embraces the pin portion 4 and also, independently thereof, by the pin 6 which is introduced into the anchorage opening 13.

Figure 2C:
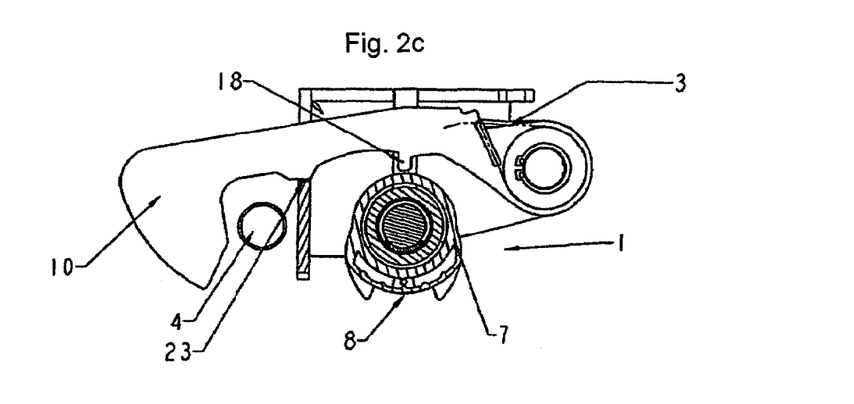

FIG. 2c shows a cross-section taken along line 2-2 in FIG. 2b, illustrating a projection 18 arranged on the securing hook 10. In the anchorage position, the securing hook 10, which embraces the pin portion 4, rests against a support surface 23 on a static part, connected to the vehicle 14, of the locking device 1.

Identical components of the arrangement will not be repeatedly identified in the Figures to be described hereinafter. The following Figures successively show the transfer of the side extension arm 15 from its secured and locked transport position into its fully extended working position and back again.

Figure 3A:
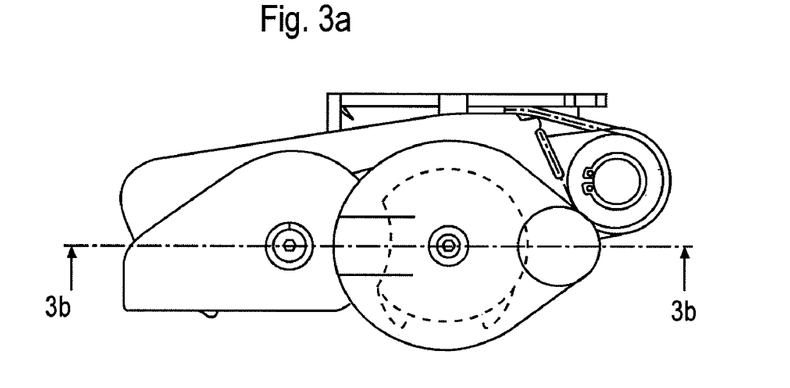
FIGS. 3a, 3b and 3c show a plan view, a longitudinal section and a cross-section, respectively, of the transport securing arrangement after a first release step.
Figure 3B:
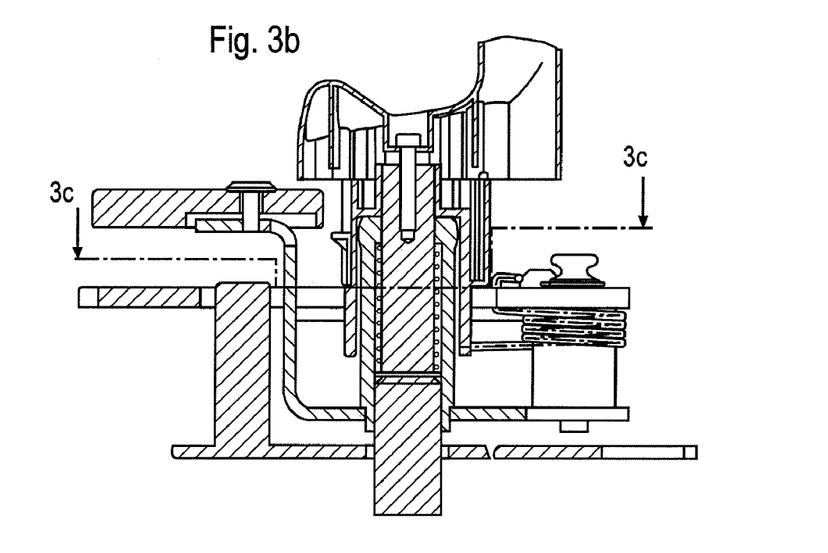
Figure 3C:
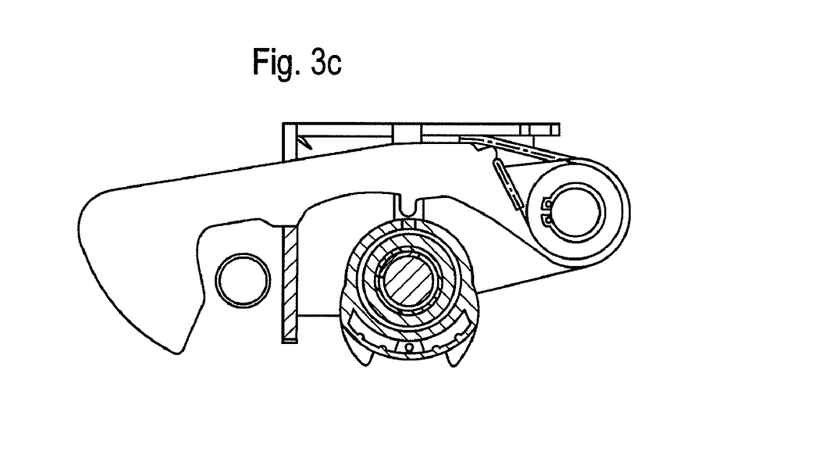

It can be seen from FIG. 3a that, in a first step, the clamping lever 2 is pivoted to release the locking device 1 so that the locking device 1 is now rotatable by way of the handle 9. FIG. 3b shows a longitudinal section through the transport securing arrangement taken along line 1-1 in FIG. 3a. FIG. 3c shows a cross-section through the transport securing arrangement according to the invention taken along line 2-2 in FIG. 3b.

Figure 4A:
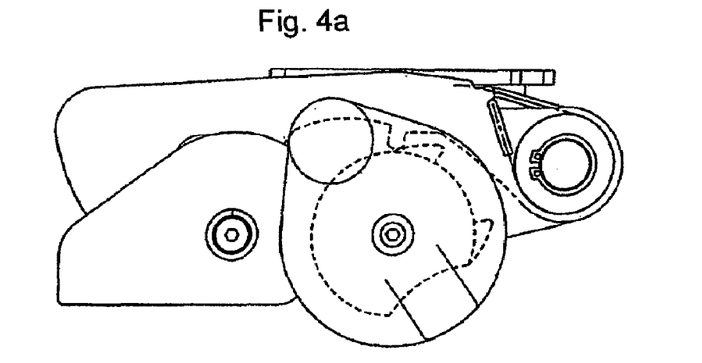
FIGS. 4a, 4b, 4c and 4d show a plan view, a side view, a cross-section and a further side view, respectively, of the transport securing arrangement according to the invention in the transport position and a partly unlocked condition.
Figure 4B:
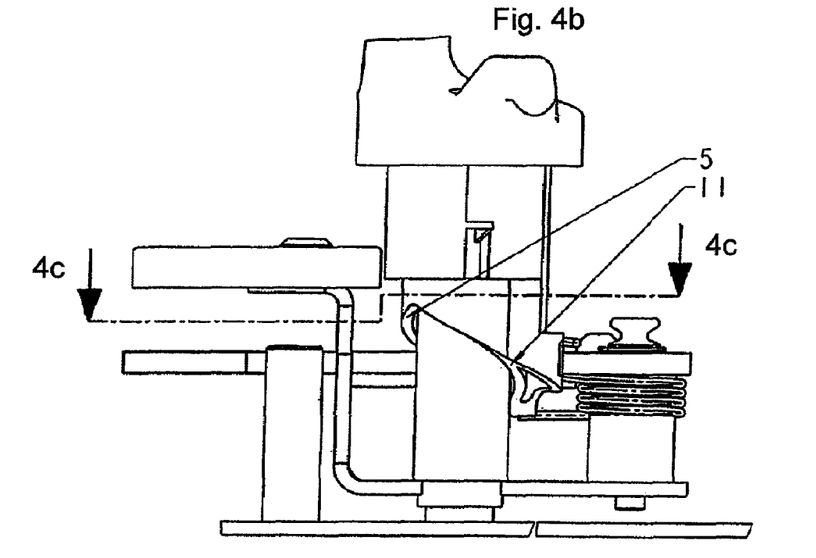
Figure 4C:
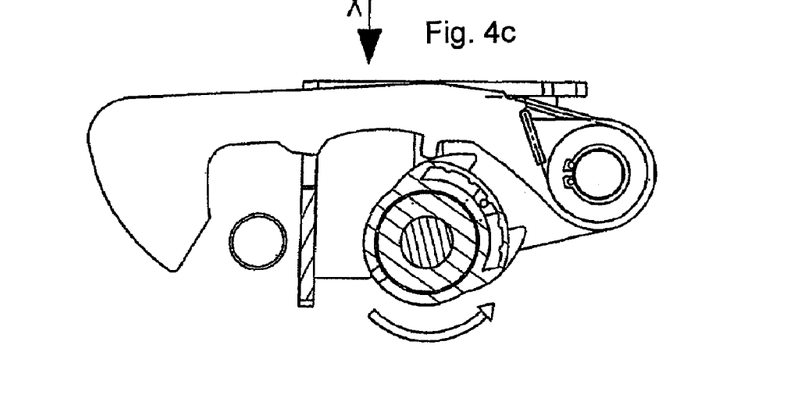
Figure 4D:
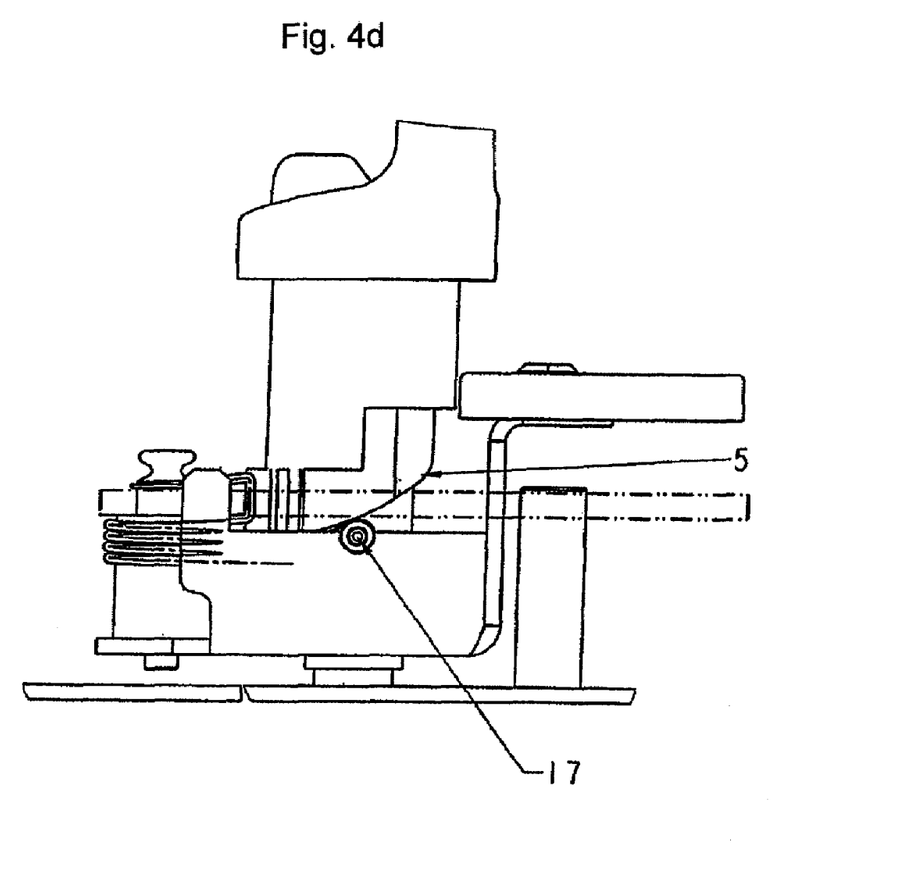

In FIG. 4a, as the next step, the cam-shaped portion 7 is rotated in the counter-clockwise direction by rotation of the handle 9, whereby the pin 6 is moved out of its anchorage opening 13 and, by the rotation of the cam-shaped portion 7, the securing hook 10 is pivoted away from the pin portion 4, by way of the projection 18 arranged on the securing hook. FIG. 4b shows a side view of the transport securing arrangement according to the invention. FIG. 4c shows a cross-section through the transport securing arrangement according to the invention, taken along line 3-3 in FIG. 4b. FIG. 4d shows a further side view of the transport securing arrangement according to the invention viewing along line X in FIG. 4c in which a pin 17 is arranged on the static housing of the locking device 1. FIG. 4c also shows guide surfaces 11 and 5 extending in an inclined manner with respect to a longitudinal center line of the locking device 1, wherein upon rotation of the locking device 1, the guide surface 5 slides along the pin 17 and thus the pin 6 connected to the locking device 1 is moved upwardly out of its anchorage opening 13.

Figure 5:
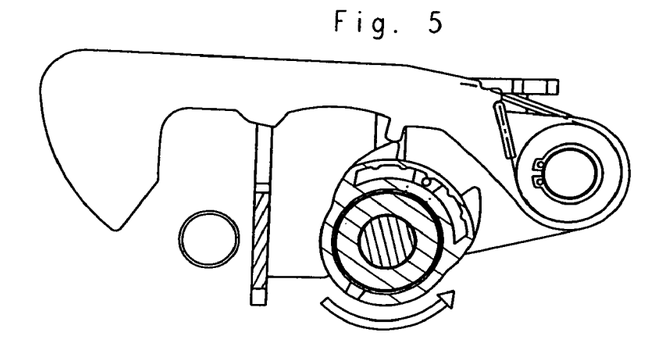
FIG. 5 is a view in cross-section of the transport securing arrangement according to the invention in a partly unlocked condition.

FIG. 5, which corresponds to FIG. 4c, shows the transport securing arrangement according to the invention after a further rotary movement of the locking device 1, whereby the securing hook 10 has passed into its maximum pivoted position by way of the projection 18, by the cam-shaped portion 7 of the locking device 1.

Figure 6A:
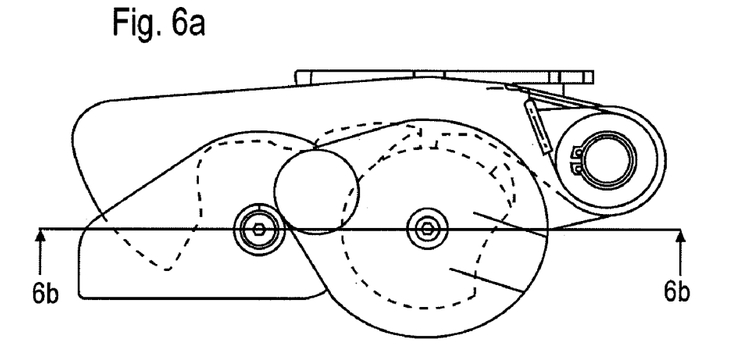
FIGS. 6a, 6b and 6c show a plan view, a longitudinal section and a cross-section, respectively, of the transport securing arrangement in the unlocked transport position.
Figure 6B:
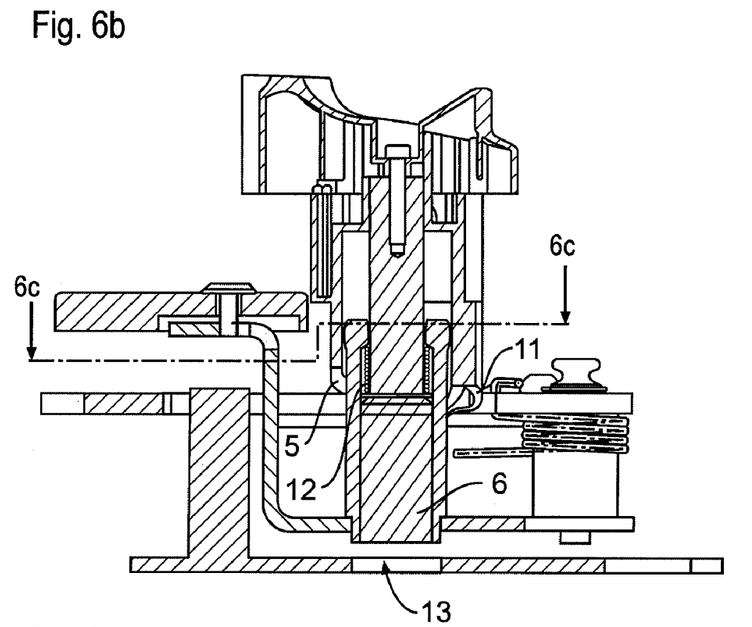
Figure 6C:
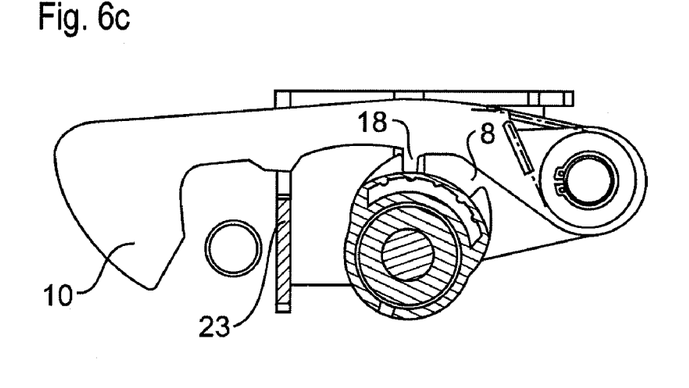

FIGS. 6a through 6c show the next condition in the time sequence, wherein, as shown in FIG. 6a, the projection 18 on the securing hook 10 has now passed into the recess 8 of the cam-shaped portion 7, whereby the pin 6 is fixed in the locking device 1 against the force applied thereto by the spring 12. It can also be seen that the securing hook 10 now no longer rests on the support surface 23 on the static housing of the locking device 1, and that the pin 6 has been moved completely out of its anchorage opening 13, whereby the spring 12 acting on the pin 6 has been compressed to its maximum. In this condition, the side extension arm 15 is in the unlocked and non-secured transport position and can now be moved out of that position.

Figure 7A:
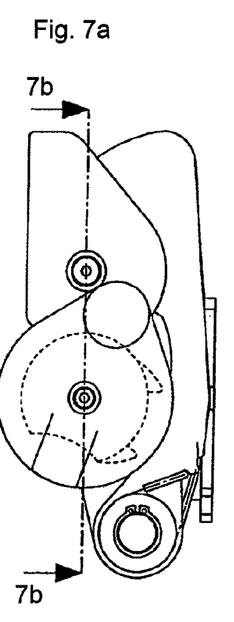
FIGS. 7a, 7b and 7c show a plan view, a longitudinal section and a cross-section, respectively, of the transport securing arrangement in the unlocked transport position.
Figure 7B:
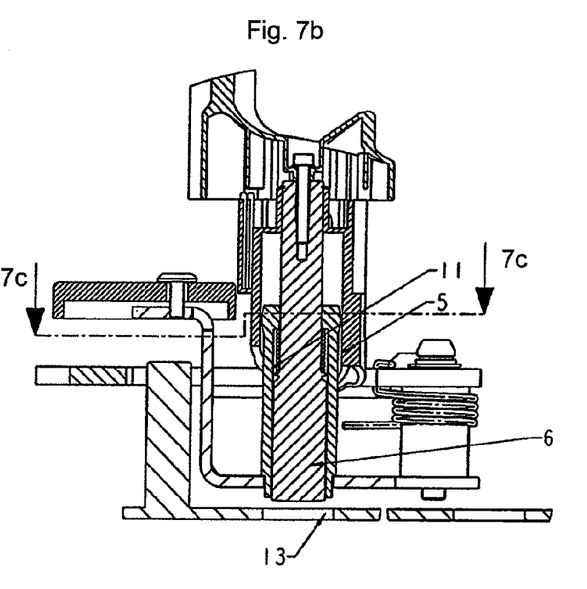
Figure 7C:
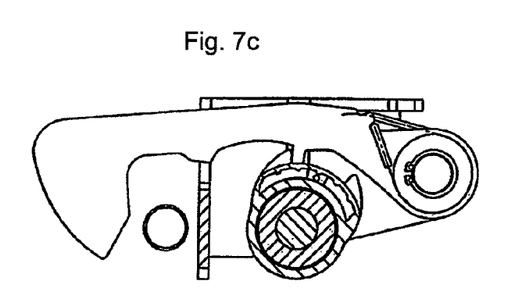

FIGS. 7a through 7c show the condition of the transport securing arrangement according to the invention after implementation of the operations described with reference to FIGS. 2 through 6, in which respect, as a distinction to FIGS. 2 through 6, the handle 9 has been actuated in the clockwise direction. This shows that the locking device 1 is releasable by rotary movement, independently of the direction of rotation. In the present embodiment this is achieved in structural terms by the arrangement of the two guide surfaces 5 and 11 with opposite screw directions, so that, upon rotation of the locking device 1 in the counter-clockwise direction, the pin 17 slides along the guide surface 5 and, upon rotation in the clockwise direction, it slides along the guide surface 11, whereby in both cases the pin 6 is moved upwardly out of its anchorage opening 13. Attention is directed in particular to the mirror-inverted positions of the guide surfaces 5 and 11 as shown in FIGS. 6b and 7b.

Figure 8A:
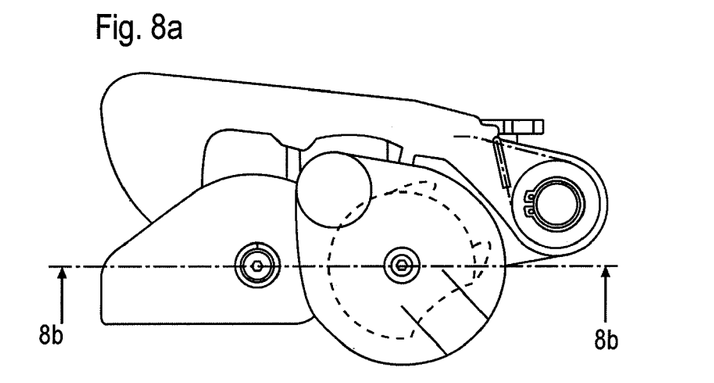
FIGS. 8a, 8b and 8c show a plan view, a longitudinal section and a cross-section, respectively, of the transport securing arrangement according to the invention after the side extension arm has been partly moved out.
Figure 8B:
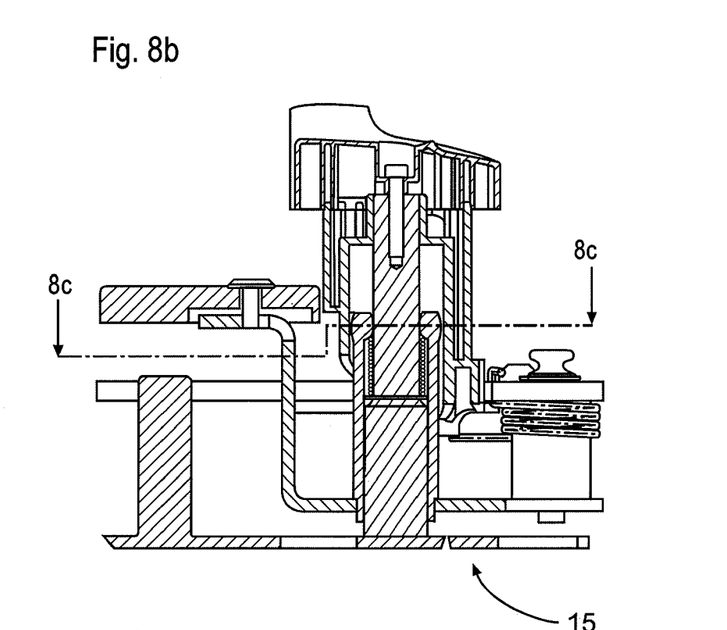
Figure 8C:
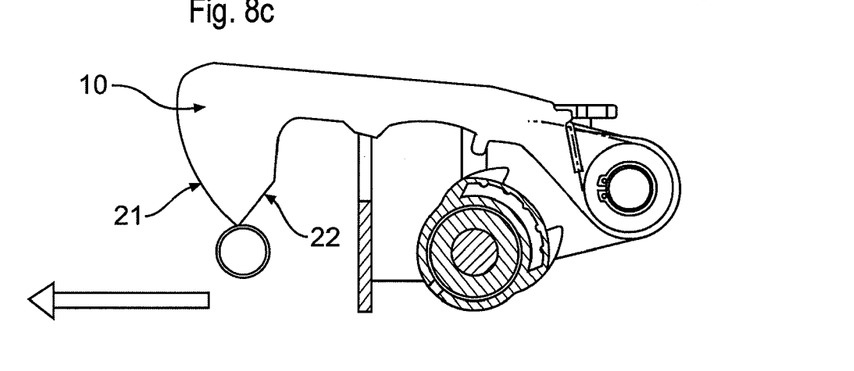

In FIGS. 8a through 8c the side extension arm 15 has already been partially moved out of its transport position in the direction of the working position, whereby the securing hook 10 has come into contact with the pin portion 4, at its inclined outside edge 21, and has thereby been pivoted. The pivoting action of the securing hook 10 moves the pin 18 out of the recess 8 of the cam-shaped portion 7 so as to release the cam-shaped portion 7 of the locking device 1. Thereby, the pin 6 has been urged downwardly on to the side extension arm 15 by the spring 12 so that the pin 6 now bears against the side extension arm 15.

Figure 9A:
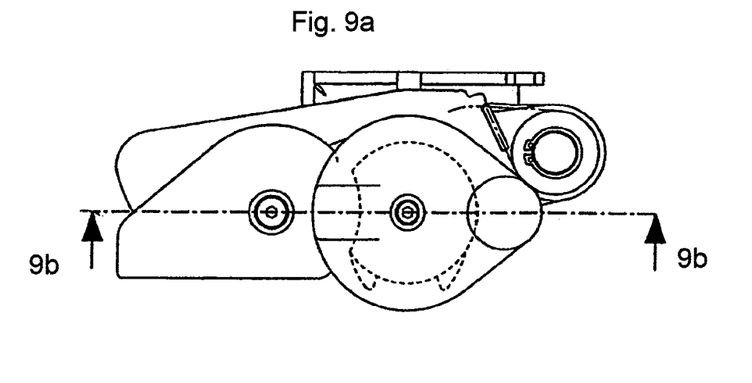
FIGS. 9a, 9b and 9c show a plan view, a longitudinal section and a cross-section, respectively, of the transport securing arrangement in the locked working position.
Figure 9B:
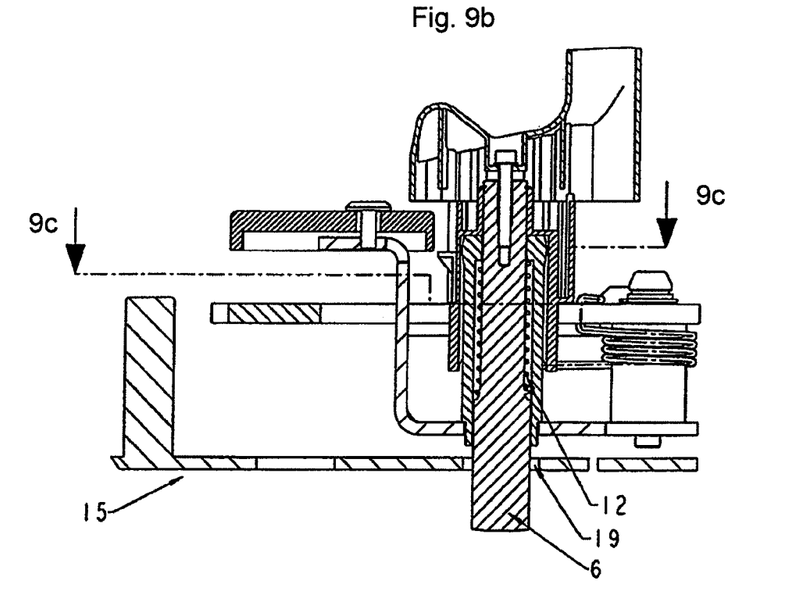
Figure 9C:
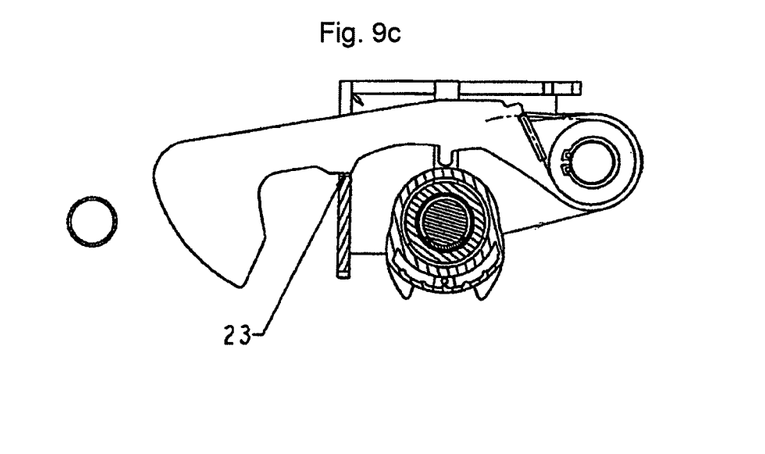

In FIGS. 9a through 9c the side extension arm has been moved into its fully extended working position. The pin 6 has been urged by the spring 12 into the outer anchorage opening 19 and the securing hook 10 now again bears against the support surface 23 on the static part of the housing of the locking device 1. Therefore, the side extension arm 15 is in its fully extended working position in which it is locked by the locking device 1.

Figure 10A:
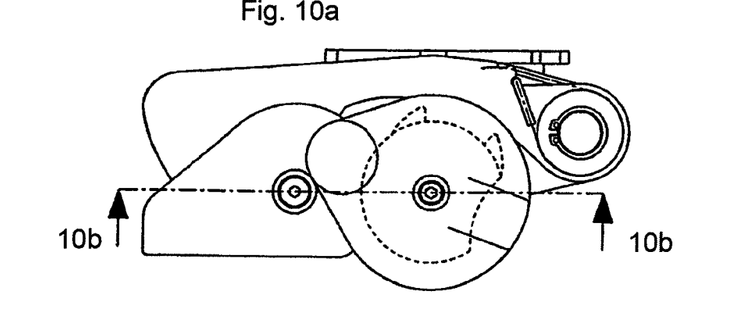
FIGS. 10a, 10b and 10c show a plan view, a longitudinal section and a cross-section, respectively, of the transport securing arrangement in the unlocked working position.
Figure 10B:
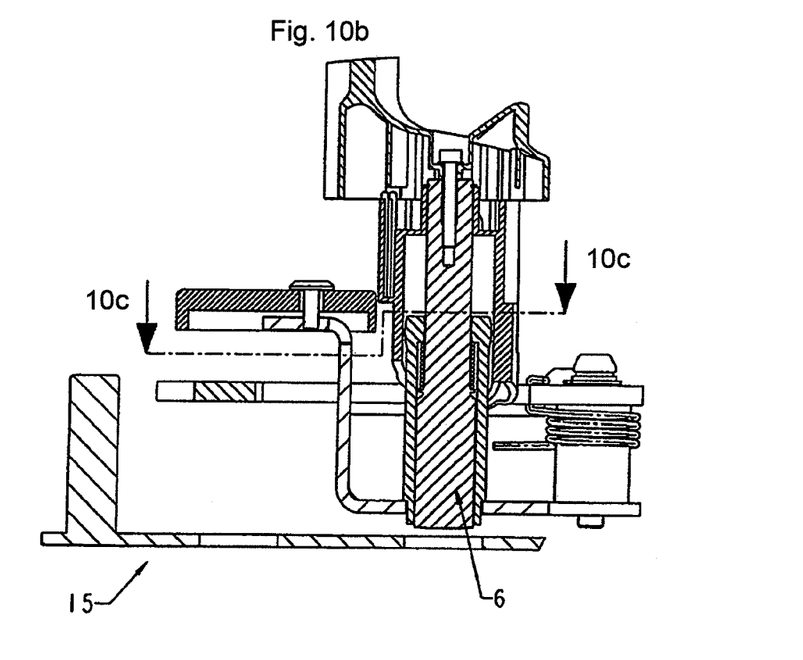
Figure 10C:
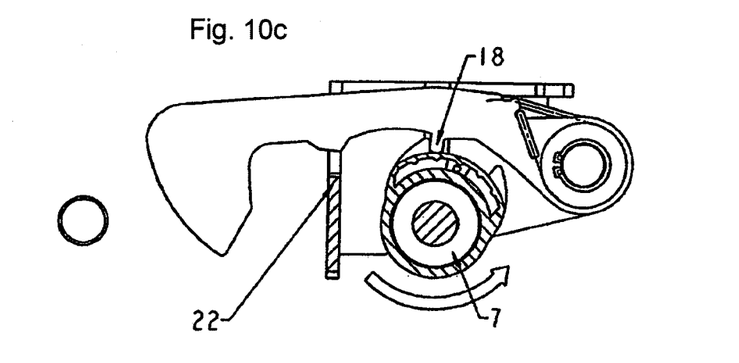

FIGS. 10a through 10c show the transport securing arrangement according to the invention after unlocking of the locking device 1, with the side extension arm 15 still being in its working position. As shown in FIG. 10c, the securing hook 10 now no longer bears against the support surface 23 on the static part of the housing of the locking device 1 but, with its projection 18, fixes the cam-shaped portion 7 whereby the pin 6 is fixed in its illustrated position.

Figure 11A:
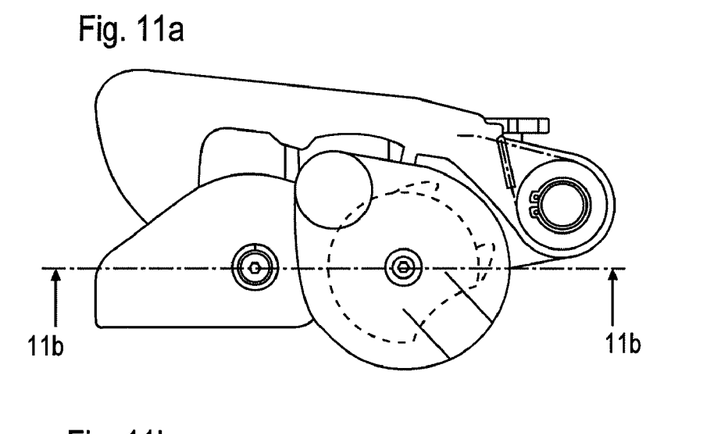
Figure 11B:
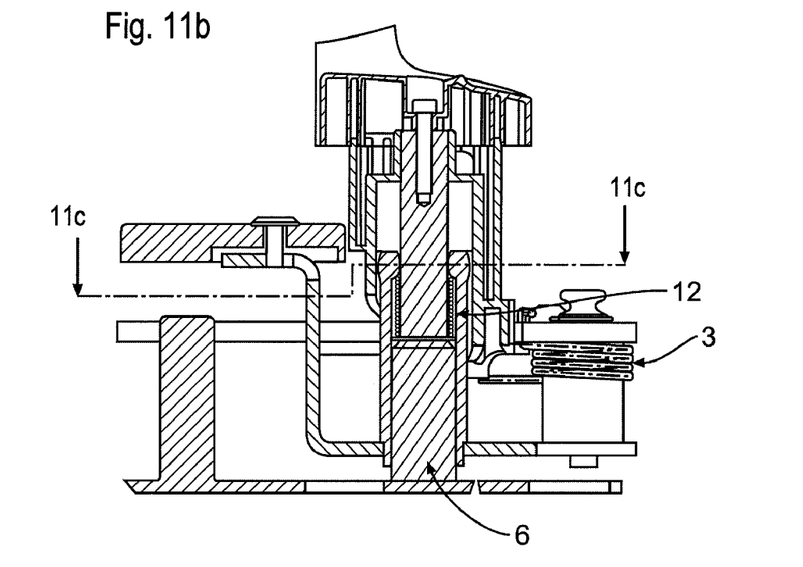
Figure 11C:
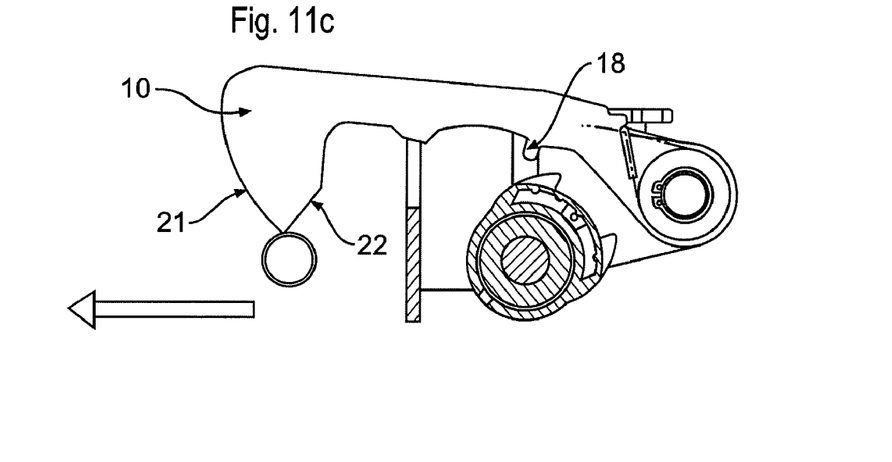

FIGS. 11a through 11c correspond to FIGS. 8a through 8c, with the difference being that the side extension arm 15 is now moved out of its fully extended working position in the direction of its inward transport position. In this case, the securing hook 10 has been pivoted by contact of its inclined inside edge 22 with the pin portion 4, whereby the cam-shaped portion 7 has been released from the projection 18 and the pin 6 is pressed against the side extension arm 15 by the spring 12. As soon as the pin 6 passes over the anchorage opening 13, by virtue of the movement of the side extension arm 15, the pin 6 is urged into the anchorage opening 13 by the spring 12 and the side extension arm 15 is thus locked by way of the locking device 1. The securing hook 10 is also urged by the spring 3 into its locking position in which it embraces the pin 4 so that the side extension arm 15 is doubly secured in its transport position.

The invention claimed is:

1. A transport securing arrangement for a side extension arm of a vehicle, said transport securing arrangement comprising:
    a locking device; and
    a securing hook,
    wherein said locking device and said securing hook are arranged such that both said locking device and said securing hook are operable to act on the side extension arm, and
    wherein said locking device is arranged in relation to said securing hook such that a release of said locking device leads to a release of said securing hook from an anchorage position.

2. A transport securing arrangement as set forth in claim 1, wherein said securing hook is pivotably supported.

3. A transport securing arrangement as set forth in claim 1, further comprising a spring, wherein said spring urges said securing hook into the anchorage position.

4. A transport securing arrangement as set forth in claim 1, wherein said locking device is rotatably supported.

5. A transport securing arrangement as set forth in claim 4, wherein said locking device is releasable by rotation of said locking device.

6. A transport securing arrangement as set forth in claim 5,
wherein said locking device is releasable upon rotation of said locking device, and
wherein the release of said locking device is independent of a direction of rotation of said locking device.

7. A transport securing arrangement as set forth in claim 4, further comprising a pin,
wherein said locking device has at least one guide surface extending in an inclined manner relative to a longitudinal center line of said locking device, and
wherein upon rotation of said locking device, said at least one guide surface of said locking device slides along said pin.

8. A transport securing arrangement as set forth in claim 1, further comprising a spring, wherein said locking device is urged in a direction of a locking position by said spring.

9. A transport securing arrangement as set forth in claim 1,
wherein said locking device includes an eccentrically shaped portion, and
wherein said securing hook partially bears against said eccentrically shaped portion of said locking device.

* * * * *